US007822754B2

(12) United States Patent
Bhogal et al.

(10) Patent No.: US 7,822,754 B2
(45) Date of Patent: Oct. 26, 2010

(54) METHOD AND SYSTEM TO PROVIDE CONTEXTUAL, INTELLIGENT ADDRESS BOOK LISTINGS

(75) Inventors: Kulvir S. Bhogal, Forth Worth, TX (US); Gregory J. Boss, American Fork, UT (US); Rick A. Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/461,851

(22) Filed: Aug. 2, 2006

(65) Prior Publication Data

US 2008/0033946 A1 Feb. 7, 2008

(51) Int. Cl.
G06F 7/00 (2006.01)
G06F 17/30 (2006.01)

(52) U.S. Cl. .................. 707/752; 455/418
(58) Field of Classification Search .......... 707/7, 707/736, 748, 752; 715/739; 455/418, 466
See application file for complete search history.

(56) References Cited

U.S. PATENT DOCUMENTS

| 6,247,043 | B1* | 6/2001 | Bates et al. ............. 709/200 |
| 6,542,733 | B1 | 4/2003 | Dennis |
| 6,587,691 | B1* | 7/2003 | Granstam et al. ........ 455/456.1 |
| 6,832,245 | B1* | 12/2004 | Isaacs et al. ............... 709/206 |
| 6,950,652 | B2 | 9/2005 | Janssen et al. |
| 6,950,994 | B2 | 9/2005 | Dharap |
| 6,956,942 | B2* | 10/2005 | McKinzie et al. ......... 379/355.04 |
| 2004/0131173 | A1 | 7/2004 | Janssen et al. |
| 2005/0203929 | A1* | 9/2005 | Hazarika et al. ........... 707/100 |
| 2006/0035632 | A1* | 2/2006 | Sorvari et al. ............. 455/418 |
| 2006/0074932 | A1* | 4/2006 | Fong et al. ................ 707/100 |
| 2006/0135135 | A1* | 6/2006 | Rybak ..................... 455/414.1 |
| 2007/0061420 | A1* | 3/2007 | Basner .................... 709/217 |
| 2007/0111712 | A1* | 5/2007 | Ratnakar ................. 455/414.1 |
| 2007/0250645 | A1* | 10/2007 | Meadows et al. ......... 709/248 |

OTHER PUBLICATIONS

"Trust for Ubiquitous, Transparent Collaboration"—Shand, B. et al.; Wireless Networks 10, 711-721, 2004, © 2004 Kluwer Academic Publishers. Manufactured in the Netherlands.
"Understanding the Micronote Lifecycle: Improving Mobile Support for Informal Note Taking"—Lin, M. et al.; CHI 2004, Apr. 24-29, 2004, Vienna, Austria, Copyright 2004 ACM 1-58113-702-8/04/0004.

* cited by examiner

*Primary Examiner*—James Trujillo
*Assistant Examiner*—Jeffrey Burke
(74) *Attorney, Agent, or Firm*—William Schiesser; Roberts Mlotkowski Safran & Cole, P.C.

(57) ABSTRACT

A system and method of providing address book listings. The system and method includes determining a weight of each identifier in an address book and sorting each identifier in a descending order or ascending order according to the determined weight. The list is provided to a user based on the sorting of each identifier.

40 Claims, 6 Drawing Sheets

| Address Book Listing | Weight |
|---|---|
| John | 4 |
| Sally | 3 |
| Adam | 1 |

FIG. 2

| MOST FREQUENTLY ACCESSED LISTING |
|---|
| Sandra |
| Greg |
| Kristie |
| Stephen |
| Rick |
| Kulvir |
| Alex |

FIG. 4

METHOD AND SYSTEM TO PROVIDE CONTEXTUAL, INTELLIGENT ADDRESS BOOK LISTINGS

FIELD OF THE INVENTION

The invention generally relates to a method and system for providing address book listings and, more particularly, to a method and system for providing contextual, intelligent address book listings.

BACKGROUND OF THE INVENTION

A cellular telephone or other portable device is a ubiquitous tool in today's modern age of communication and technology. For example, a cellular telephone allows a user to perform many important functions ranging from emailing, Short Message Servicing (SMS) and sending photos, to name but a few. However, for all of its features and conveniences, the cellular telephone still has many of its own shortcomings.

By way of illustration, a cellular telephone includes an address book which can store hundreds of entries. But, to access these entries can be a very tedious and time consuming task, e.g., performing look-ups, due to inefficiencies in current methodologies and systems. For example, to gain access to a name for the purpose of dialing, emailing, SMS'ing, sending photos, etc., involves typing on limited keyboard input mechanisms which generally require multi-tap input methods. Multi-tap refers to the method for inputting letters on a keypad which only has 10 general number input keys. In these cases, the number keys double as letter equivalents for certain functions.

In one example of multi-tap, since there are nine physical keys and 26 alphabetical characters, most keys serve as input mechanisms for three to six letters and sometimes as many as eight. And, in these methodologies, the cellular telephones have universal mappings, e.g., with the "2" key serving as the entry point for a, b, c, A, B, and C. Below is the typical mapping:

| Key Number | Letter Mapping |
|---|---|
| 2 | abc |
| 3 | def |
| 4 | ghi |
| 5 | jkl |
| 6 | mno |
| 7 | pqrs |
| 8 | tuv |
| 9 | wxyz |

In this mapping scheme, if a user wants to enter the name "Smith," for example, it will require a sequence of keys as follows: 7 7 7 7 7 7 7 (cycle twice to get an upper case "S") 6 4 4 4 8 4 4. Obviously, this requires a total of 15 keys pressed with the existing multi-tap method. And if all uppercase letters are desired then it will take an unwieldy 31 characters.

T9® text entry is an attempt to reduce the number of keys required to enter a name by employing a dictionary of common words. In this methodology, T9 software combines groups of letters found on each telephone key with a database of words in an attempt to recognize text. As an example, a user would just type the corresponding key once and move on to the next key, while the T9 dictionary attempts to guess the intended word.

More specifically, a user can enter the word "how" with only three key presses: 4-6-9, without the need to press a single key multiple times. This methodology has some success for some word combinations but for a very many words it misses the intended word because there are so many variations. For example, the word "cat" "bat" and "act" all use the same key combination of 2/2/8. In these cases, the T9 software can show the user the most commonly used word first. If the word desired is not the first presented word, T9 system then allows for scrolling through all the possible words that match and portions of words that start with the combination of key presses. In the case of this example there are 8 different words or word portions to scroll through If the T9 system does not recognize the word being entered, it is necessary then to switch to the multi-tap methodology. Words commonly not recognized by the T9 system are first and last names and therefore not optimal for address book entry/lookup.

In other methodologies, most current cellular telephones will sort address book names alphabetically and will remove all other names not matching the current key sequence typed in by the end user. This will help narrow down the list of available choices without having to type the whole name. This methodology, though, also has its drawbacks by not allowing the user to efficiently search and find frequently used numbers, etc.

Accordingly, there exists a need in the art to overcome the deficiencies and limitations described hereinabove.

SUMMARY OF THE INVENTION

In a first aspect of the invention, a method comprises determining a weight of each identifier in an address book and sorting the each identifier in a descending order or ascending order according to the determined weight. The list is provide to a user based on the sorting of each identifier.

In another aspect of the invention the method comprises managing an address book by assigning weights to listings in the address book based on predetermined criteria and providing a list of the listings in a sorted order based on the assigned weights, independent of an alphanumerical ordering.

In another aspect of the invention, a system comprises a server having a database containing data associated with one or more address books, and at least one of a hardware and software component for assigning weights to listings in the address book based on at least one of: frequency of past requests, access by association and action type. The system further provides the weighted listings in a sorted order, independent of an alphanumerical sort order.

In another aspect of the invention, a computer program product comprising a computer usable medium having readable program code embodied in the medium is provided. The computer program product includes at least one component to assign a weight of each listed recipient in an address book and sort the each listed recipient according to the assigned weight into a user format. The code further includes at least one component for providing a sorted user format to a user.

In another aspect of the invention a process is provided for integrating computing infrastructure, comprising integrating computer-readable code into a computer system, wherein the computer system comprises a computer usable medium. The code in combination with the computer system is capable of performing a method comprising determining a weight of each identifier in an address book and sorting the each identifier in a descending order or ascending order according to the determined weight, independent of an alphanumeric sorting. The code in combination with the computer system is further capable of providing a list to a user based on the sorting of each identifier.

BRIEF DESCRIPTION OF THE DRAWINGS

FIG. 2 is a graphical representation of a graphical user interface (GUI), implementing aspects of the invention;

FIG. 4 is a graphical representation of a graphical user interface (GUI), implementing aspects of the invention.

DETAILED DESCRIPTION OF EMBODIMENTS OF THE INVENTION

The invention is directed to a method and system for providing address book listings and, more particularly, to a method and system for providing contextual, intelligent address book listings using a cellular telephone, for example. The invention can also be implemented with a land-line telephone, email address book, as well as SMS or other electronic means over any network, for example. The method and system of the invention, in embodiments, accelerates a user's search of an address book by implementing novel searching and retrieval methodologies.

In embodiments, the method and system of the invention is configured to accurately anticipate an identifier (e.g., name) from an address book for sending a communication, etc. The method and system of the invention employs a weighting system based alone or in combination on most frequently accessed names, access by association, and/or contextual access methodologies to provide quicker access to desired names.

By way of one illustration, if the user is making a telephone call, the list may be sorted by the most frequently called identifiers (names). By contrast, if the user is sending an SMS message the list may be sorted by the names or other types of identifiers most frequently messaged; whereas, if the user is sending a photo or video clip the names or other types of identifiers may be sorted by the most frequently used names for photo or video transmission. Additionally, if a message has other names or other types of identifiers within the body of the message (a reply for instance or a message sent immediately following the act of reading another message) then an association methodology can be used to help organize the most likely names (or other types of identifiers) desired at the top of the list of potential names (rather than just alphabetically). The list may be provided in an ascending or descending order based on a weight. Thus, by implementing the invention, it is now possible to accelerate a search of address book listings in a variety of different applications.

Figure 1:
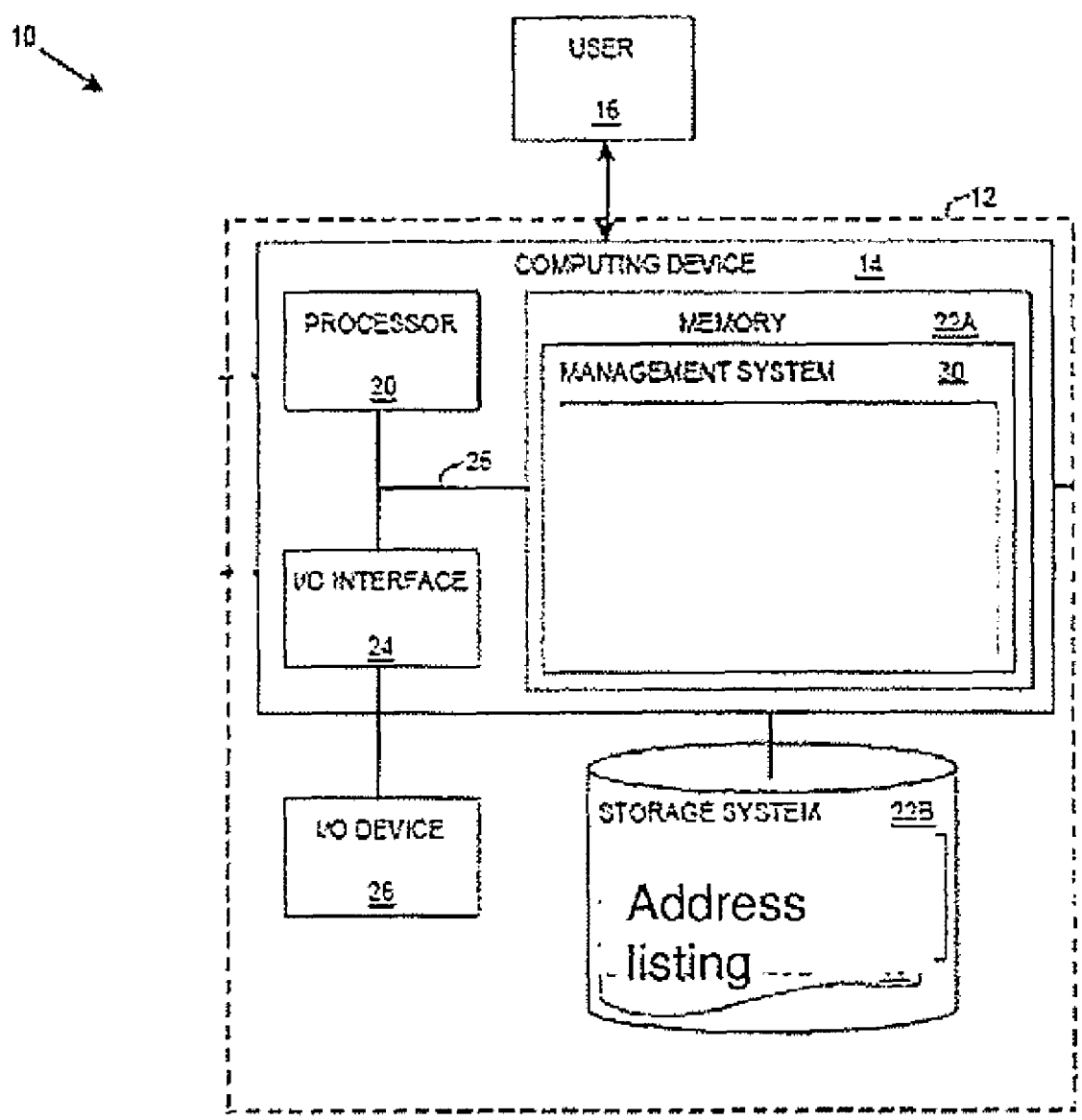
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises a management system 30, which makes the computing device 14 operable to perform the search and retrieval of address book listings in accordance with the invention. In one implementation of the invention, the computing device 14 is representative of a cellular telephone.

The computing device 14 is shown including a processor 20, a memory 22A, an input/output (I/O) interface 24, and a bus 26. Further, the computing device 14 is shown in communication with an external I/O device/resource 26 and a storage system 22B.

As is known in the art, in general, the processor 20 executes computer program code, which is stored in memory 22A and/or storage system 22B. The computer program code may be executable code implementing the processes in accordance with the invention. While executing computer program code, the processor 20 can read and/or write data, such as the address book listings, to/from memory 22A, storage system 22B, and/or I/O interface 24, in accordance with the invention, as described in more detail below. The bus provides a communications link between each of the components in the computing device 14. The I/O device 26 can comprise any device (e.g., a keyboard or telephone keypad) that enables an individual or user 16 to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.) to implement the steps of the invention such as, for example, providing a weighting based on the methodologies described herein, in addition to sorting and listing capabilities. However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention or providing an environment thereto. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g. the Internet, a wide area network, a local area network, a virtual private network, etc.); and/or utilize any combination of various types of transmission techniques and protocols. As discussed herein, the management system 30 enables computer infrastructure 12 to manage the address listings and related methodologies described herein.

The following methodologies are provided in accordance with the invention. These methodologies can be implemented separately, or in any combination.

Most Frequently Accessed (MFA) Methodology

In accordance with the invention, a most frequently accessed strategy can be implemented to efficiently manage an address list. In this implementation, a moving window of "X" units of time is associated with the number of previous times that a name (or other types of identifiers) was accessed by the user, over a known period. For example, in this implementation, a weight or rank will be associated with each identifier (herein after referred to generally as "name"), increasing such weight or ranking based on the number of times (frequency) that listing was previously accessed in the address list. In this example, as well as the other implementations of the invention, the most frequently accessed (MFA) list can be maintained separately for telephone calls, emails, SMS messages, or any other functionality on a cellular telephone or other device.

By way of illustrative implementation according to the invention, if a user calls "John" four times, "Adam" one time, and "Sally" three times, each scenario occurring over the last two weeks, the system and method of the system would provide the following weighting or ranking:

| Address Book Listing | Number of Times Previously Accessed | Weight | Time Period |
|---|---|---|---|
| John | 4 | 4 | 2 weeks |
| Sally | 3 | 3 | 2 weeks |
| Adam | 1 | 1 | 2 weeks |

In this illustrative implementation, the invention utilizes a moving weight, such that if the user attempts to call Adam, for example, the weighting or ranking of Adam will increase to "2". Although John will remain at the top of the list with a ranking or weight of "4", Adam will now have a weight or rank of "2", which was previously a rank of "1". The list, as in any implementation of the invention, can be provided in ascending or descending order, although, the list is preferably provided from most heavily weighted (at top) to the least heavily weighted.

Thus, by implementing the MFA in accordance with the invention, the method and system of the invention, over a predetermined period (e.g., two weeks), tracks the number of emails or other transmissions (e.g., SMS, telephone calls, etc, depending on the action type selected) sent to each name listed in the address book and tabulates a weight based on a frequency of times the user accesses the name. A user graphical interface showing this example is provided in FIG. 2.

Figure 3:
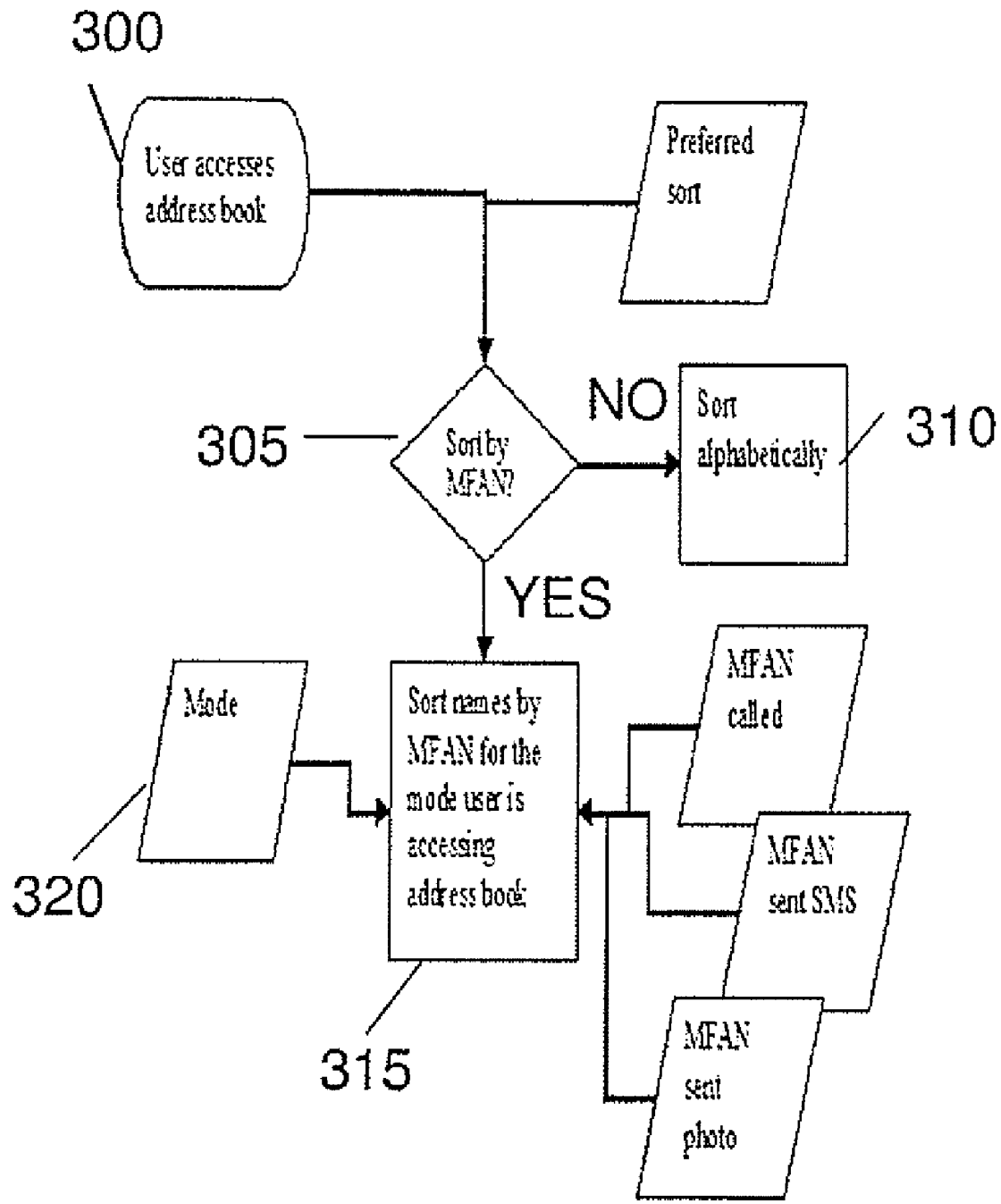
FIG. 3 is a representation of a flow chart of steps for implementing aspects of the invention.

FIG. 3 is a flow diagram implementing steps of the invention. FIG. 3 (and all other flow diagrams) may equally represent a high-level block diagram of the invention. The steps of the flow diagrams may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to provide the method and system for contextual, intelligent address book listings. In this case, the service provider can create, maintain, and support, etc., a computer infrastructure that performs the steps of the invention for one or more customers. In return, the service provider can receive payment from the customer(s) under a subscription and/or fee agreement and/or the service provider can receive payment from the sale of advertising content to one or more third parties.

Referring back to FIG. 3, in the following example, to further illustrate the MFA of the invention, at step 300, the user may access an email address (or alternatively a text message, SMS, voice call, photo or other action type) of one or more recipients (names) listed in an address book, which traditionally contains an alphabetic listing of names such as, for example, Alex, Greg, Rick, Kristie, Kulvir, Sandra and Stephen, in this order.

By implementing the MFA scenario in accordance with the invention, the method and system of the invention, over a predetermined period (e.g., two weeks), tracks the number of emails or other transmissions (e.g., SMS, telephone calls, etc, depending on the mode of the application) sent to each name listed in the address book. At step 305, a determination is made as to whether the user desires to implement the MFA. If not, at step 310, the list of the address book is sorted and provided alphabetically, as in traditional methods, if the MFA is implemented, at step 315, the list is provided to the user based on a weight, e.g., a frequency of times the user has accessed certain names in the address book.

At step 320, the user may select between action types or modes such as, for example, SMS, photos, emails, etc., at which stage, the method and system would son the names of the address book for each individual mode. It should be recognized that the steps of FIG. 3 may be implemented in a variety of different logical orders. For example, step 320 may be implemented prior to any of the previous steps.

Based on the frequency, the method and system of the invention tabulates (calculates) the frequency of names in the address book accessed by the user and, in embodiments, formulates a table which may include, illustratively, the following example. This as well as other tables may also be considered hash tables which are later sorted according to the invention.

| Name | Frequency of Calls |
|---|---|
| Sandra | 15 |
| Kulvir | 9 |
| Rick | 4 |
| Stephen | 5 |
| Kristie | 2 |
| Greg | 12 |
| Alex | 1 |

Thus, in accordance with the invention, at step 315, the method and system of the invention will sort the listings of the address book according to weights or rankings based on the most frequently accessed listings, and provide such listing to the user. In the example above, the system and method would provide the user with the interface shown in FIG. 4, which depicts the order of most recently and frequently accessed names over a period of time, for example.

As should be appreciated by those of skill in the art, the method and system of the invention can repeat the above steps for each time the user accesses the address book listings and/or transmits or inputs a new telephone number, email address, etc. Additionally, it should be appreciated by those of skill in the art, that the method and system of the invention can dynamically and automatically change the ordering (reorder) of the list by calculating (determining) the most frequently accessed listings over a predetermined period of time. Thus, for example, if the MFA was set for a two week period of time, the list of FIG. 4 list can automatically and dynamically change after a two week floating period such that any name may be excluded from the list, additional names can be included in the list or any name may have its weight increase or decrease, regardless of access to the system.

In a form of the invention, as shown in FIG. 4, according to the illustrative example, using an MFA list without any other combined sorting strategy will result in "Sandra" showing up at the top of the list due to the frequency of previous transmissions over a certain period of time. It is further contemplated, in embodiments, if a certain character, e.g., "k" character, is chosen as the first character to appear on the list, Kulvir would appear preferentially over Kristie because of their relative MFA listing weight.

Access by Association (or Dynamic Groups) Methodology

In embodiments of the invention, it is contemplated that users have several applications that allow for interaction with multiple names from an address book. In order for the user to efficiently execute some action type (e.g., sending an email, a message, a photograph, etc) the user can select one or more names at a time. When the user does this, an association of multiple names is created and added to the most frequently accessed list by modifying the weight already established from the MFA. When the user scrolls through the most frequently accessed names, a group of names can take one slot in the list. The weight provided by the associations can be implemented alone, without the need to modify any previous weights.

As an example, the user's phone book contains the following address book listings:

| |
|---|
| Alex |
| Greg |
| Rick |
| Kristie |
| Kulvir |
| Sandra |
| Stephen |

In this embodiment, the user selects an action type, e.g., send photos, and an individual(s) to send the photos. The method and system creates a weight based on the association, and in embodiments modifies the weight established from the MFA and makes an association between the selected individual with other individuals address listings, based on a frequency, that the associated individual(s) has been previously sent a transmission, e.g., photos, along with the selected individual.

Figure 5:
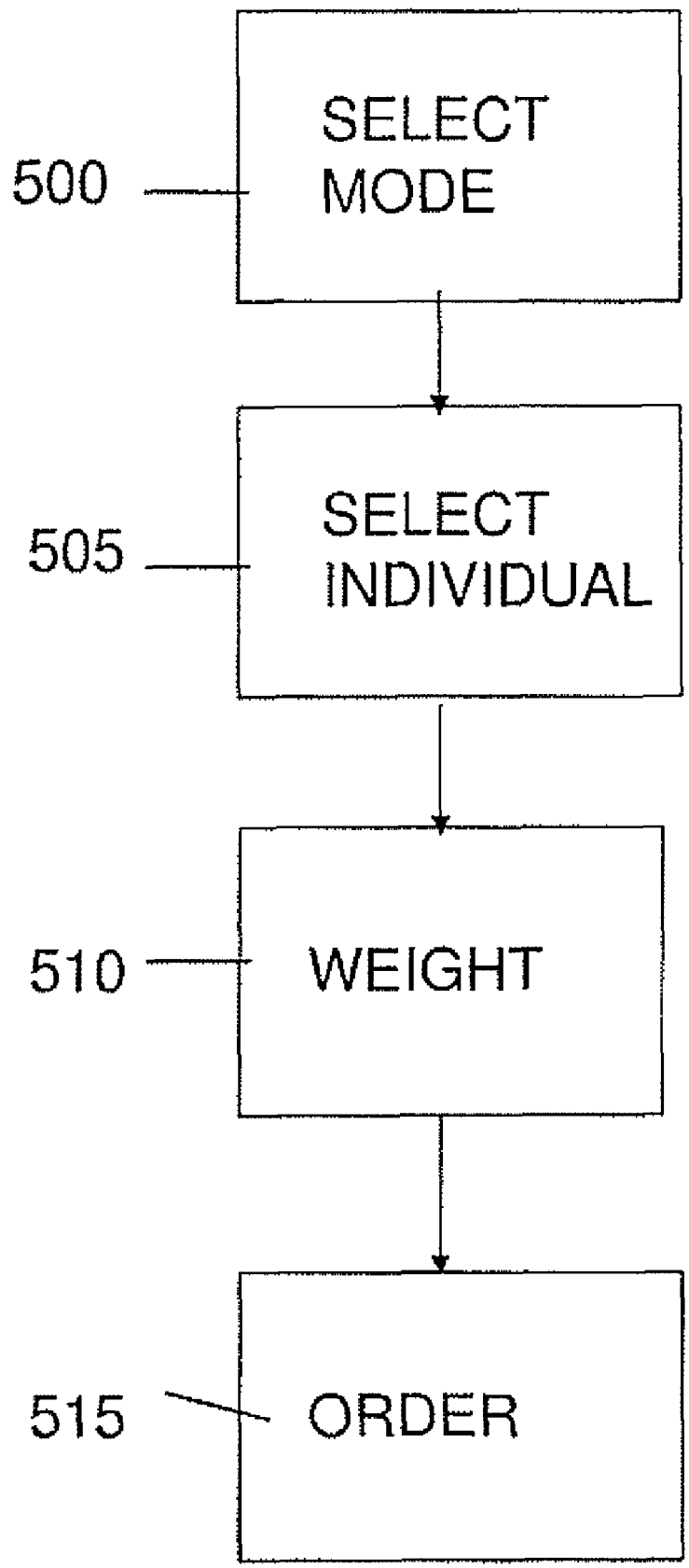
FIGS. 5-7 are a representation of flow charts of steps for implementing different aspects of the invention.

More specifically, in embodiments and referring to FIG. 5, at step 500, a user selects a mode or certain context, e.g., action type such as email, sending photo, SMS, etc. At step 505, the user selects a name in which the communication will be sent. This can be selected from the MFA list, as described above. At step 510, a weight is calculated based on an association between the selected individual and other individuals which were previously sent the same type of communication, e.g., email, SMS, etc, along with the selected individual.

In embodiments, the access by association weight can be implemented to the exclusion of the MFA weight, or in combination therewith to achieve an overall weight. By way of the latter example, in MFA, the weight may be based on the frequency of times the user has selected the individual for a certain type of communication or action. In the embodiment of the invention, the MFA weight may modified by using the associated frequency methodology, e.g., the communication type has been associated with the selected individual and other individuals. In this case, for example, if Sandra has a weight of "4" and she is associated with Rick four times, then the weight of Sandra and Rick may be "8". In comparison, Sandra may be associated with Kulvir only twice, resulting in a weight of "6".

At step 515, the associated names or individuals with the highest weights can then be sorted by rank, from the top to the bottom of a list, in order for the user to easily and efficiently select such individual(s). In embodiments, the associated individual(s) can automatically be added to the "To" (or send) list, without the need for the user to select such individuals. In this contemplated embodiment, the user may be provided with the opportunity to delete the associated individuals from the send list.

By way of a further example, the following table shows associations between individuals on an email "To" list. In this example, when Rick is included in the "To" list of an email there is a high probability (8) that Sandra will also be included in that email. In this illustration, after Rick is added to the "To" field of an email, Sandra will show up at the top of the list in order to allow the user (sender) the opportunity to send the email to Sandra, as well. These weights are considered a modifier to the MFA list described above.

By way of additional example, the invention further contemplate scrolling through the list of possible associations. For example, if another entry for Rick is added, e.g., Alex, and this entry is associated enough times to have a weight of "4" then the user can scroll either through Rick/Sandra or Rick/

Alex or Rick, alone. In the latter situation, Rick by himself would have a weight of zero, which is the default for all individual entries.

| Name | Associated TO list | Frequency |
|---|---|---|
| Greg | Sandra | 4 |
| Kulvir | Stephen, Kristie | 1 |
| Sandra | Kulvir, Greg, Rick | 3 |
| Rick | Sandra | 8 |
| Alex | Kulvir, Sandra | 2 |
| Rick | Alex | 4 |

Contextual Access Methodology

In further embodiments, contextual access can also be implemented by the method and system of the invention. In contextual access, the method and system of the invention has the ability to store the list by the context in which the list of names is accessed. This allows for multiple representations of the same list based on the context of what the user is doing with the address book.

Figure 6:
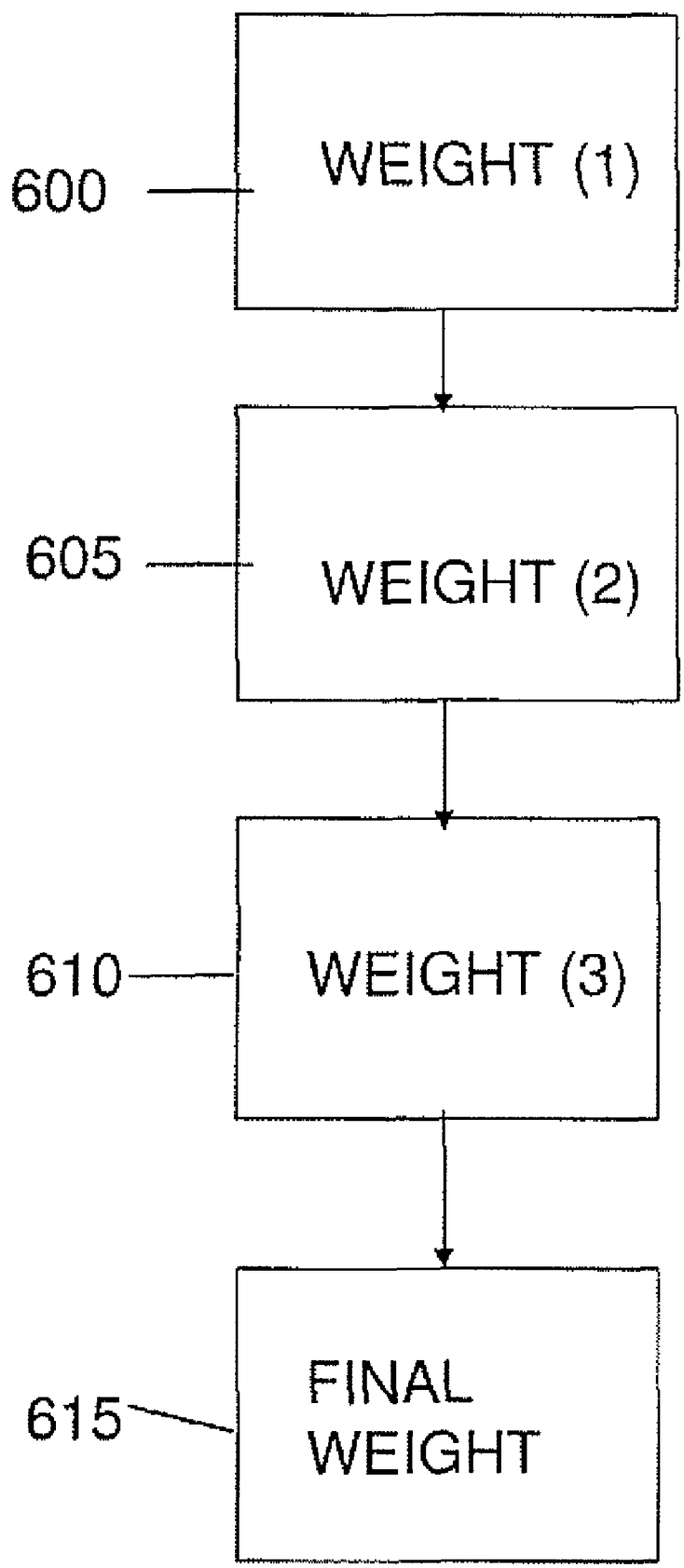

The following example shows a contextual access list incorporating embodiments of the MFA and access by association, depending on the multiple contexts from which the user may have used the names. Referring to FIG. 6, for example, at step 600, a weight may be tabulated or calculated based on a frequency a user sends certain action types, e.g., email, SMS, etc, to individuals. This is graphically shown in the following table.

| Name | Frequency | Weight |
|---|---|---|
| Sandra | 15 | 15 |
| Kulvir | 2 | 2 |
| Rick | 4 | 4 |
| Stephen | 5 | 5 |
| Kristie | 9 | 9 |
| Greg | 12 | 12 |
| Alex | 1 | 1 |

At step 605, by implementing the association list as modifier to the MFA, a further weight can be obtained. For example, the following table, in accordance with the above description, shows a result of a weight based on the frequencies of the MFA and association embodiments. Illustratively, Greg may have a weight of "16" based on an MFA frequency of "12" and an association frequency of "4".

| Name | Associated TO list | Frequency | Weight |
|---|---|---|---|
| Greg | Sandra | 4 | 16 |
| Kulvir | Stephen, Kristie | 1 | 3 |
| Sandra | Kulvir, Greg, Rick | 3 | 18 |
| Rick | Sandra | 8 | 12 |
| Alex | Kulvir, Sandra | 2 | 3 |

At step 610, in accordance with the embodiments of the invention, the contextual access weight (which can be used as a modifier) can be tabulated based on frequency of times each individual's name was accessed by the user for a particular context. This is shown graphically in the below table. These weights, as with any of the embodiments herein, may be based on one or more factors such as frequency.

| Name | Context | Weight |
|---|---|---|
| Greg | email | 4 |
| Greg | SMS | 3 |
| Greg | Voice | 13 |
| Kulvir | email | 1 |
| Kulvir | SMS | 2 |
| Kulvir | Voice | 6 |
| Sandra | email | 14 |
| Sandra | SMS | 0 |
| Sandra | Voice | 2 |

Finally, at step 615, using the weights of the context, MFA and access by association, a modified weight can be determined, as shown in the two following tables. More specifically, a master weight may be calculated based on the frequency of the context, MFA and access by association weights. In embodiments, this can be an additive process as shown in the below tables, for each context, although each type of weight can be given a modifier so that each weight is not equal in point values to every other weight. For example, it may be that a user prefers more weight be giving to "context" than to "association" or vice versa.

Weighting for Action: Email

| Name | Context | MFA | Association | Master Weight |
|---|---|---|---|---|
| Greg | 3 | 4 | 14 | 19 |
| Kulvir | 1 | 1 | 2 | 4 |
| Sandra | 14 | 3 | 15 | 32 |

Weighting for Action: Voice

| Name | Context | MFA | Association | Master Weight |
|---|---|---|---|---|
| Greg | 13 | 4 | 12 | 29 |
| Kulvir | 6 | 1 | 2 | 9 |
| Sandra | 2 | 3 | 15 | 20 |

An interpretation of the above example shows that if the user is writing an email, the most likely person that he/she will interact with is Sandra, who has a weight of 32. However, if that same user is making a voice call, then the most likely person will be Greg with a rank of 29.

It should be understood by those of skill in the art that any of the embodiments may be used in any combination or alone which, in turn, can be used to obtain an ordered list of names from an address book. For example, the MFA and access by association methodologies may be combined in order to provide a weight based on both methodologies. Similarly, the context and MFA can be combined to provide a weight on such methodologies. Similarly, the access by association and context methodologies can be combined to implement a weight. Also, the three methodologies can be combined to obtain a weight which, in turn, is used to obtain an ordered list of names from the address book. Additionally, as discussed, any of the embodiments may be weighted differently such that when combined one methodology may provide a heavier weight than another methodology, depending on the implementation of the user.

Figure 7:
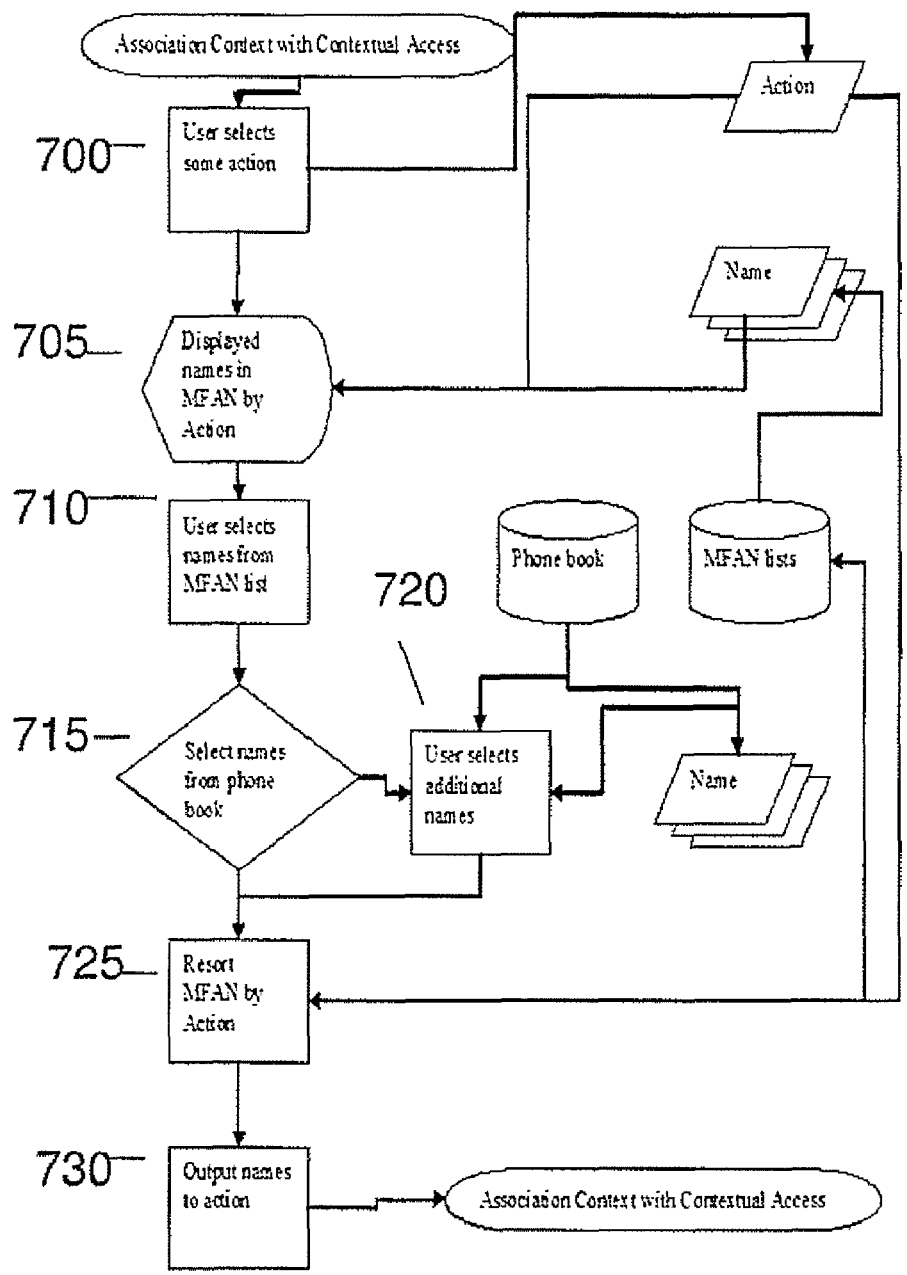

By way of further example, FIG. 7 shows an example implementing the MFA, access by association and contextual access in accordance with the invention. At step 700, a user selects an action such as, for example, email, SMS, etc. At step 705, the method and system of the invention displays the names in MFA, action type by the action type. At step 710, the user selects the name from the MFA list. At step 715, a decision is made as to whether an association list is required. If yes, at step 720, the user will select additional names, associated with the first selected name, at step 710. The associated name may also be automatically provided in the send field, for example, from an MFA database. If not, then at step 725, the method and system resorts to the MFA database and outputs the names by action type at step 730.

While the invention has been described in terms of embodiments, those skilled in the art will recognize that the invention can be practiced with modifications and in the spirit and scope of the appended claims.

What is claimed is:

1. A method of providing address book listings on a user device utilizing hardware in combination with a computer program product comprising a computer usable storage medium having readable program code embodied in the storage medium, the method comprising:
   determining a weight of each identifier in an address book;
   sorting the each identifier in a descending order or ascending order according to the determined weight;
   determining whether the user wishes to implement a most frequently accessed (MFA) scenario and, if so, providing an MFA list from a database to a user on the user device based on the sorting of each identifier;
   tabulating a contextual access weight and determining a master weight based on frequency of context;
   calculating another weight based on an association between a selected recipient and other recipients which were previously sent the same type of communication;
   separately maintaining, from a listing of names previously accessed, the MFA list in the user device; and
   modifying a weight of an identifier on the MFA list,
   wherein the determining assigns the weights based on frequency of sending, and
   wherein the sorting and the determining whether the user wishes to implement the MFA scenario includes, allowing the user to select a mode on the user device and, after the user selects the mode, sorting recipients for the selected mode using the MFA scenario.

2. The method of claim 1, wherein the weight of each identifier is calculated based on a frequency of past requests for each identifier.

3. The method of claim 1, further comprising determining the weight of each identifier over a predetermined period of time.

4. The method of claim 1, wherein the weight of each identifier is determined separately for one or a combination of modes, and changes dynamically over a period of time, regardless of a requested action.

5. The method of claim 4, wherein the modes are at least sending of email, Short Message Servicing (SMS), telephone calls and transmission of attachments.

6. The method of claim 1, wherein the steps of claim 1 are provided by a service provider on at least one of a subscription, advertising and fee basis.

7. The method of claim 6, wherein the service provider at least one of creates, maintains and supports a computer infrastructure that performs the steps of claim 6.

8. The method of claim 1, wherein the weight of each identifier is based on frequency of previous accesses of the identifier and modified by associations with other associated identifiers via the calculating of the other weight.

9. The method of claim 1, wherein the weight of each identifier is a moving weight.

10. The method of claim 1, wherein the sorting is tabulated.

11. The method of claim 1, further comprising reordering the listings in the address book according to the weight of each identifier based on at least MFA listings during a predetermined time period.

12. The method of claim 1, further comprising modifying the weight of each identifier based on separate predetermined criteria.

13. The method of claim 12, wherein the weight of each identifier is calculated based on a combination of a frequency of previous requests and a requested action type.

14. The method of claim 13, wherein the weight of each identifier is modified for a particular action type.

15. The method of claim 1, wherein an identifier or identifiers are automatically added to a send field based on a given weight.

16. The method of claim 1, wherein the master weight is tabulated based on frequency of context, association and frequency of past requests.

17. The method of claim 16, wherein the master weight is calculated using an additive process.

18. The method of claim 1, wherein the identifier is a person's identification.

19. A method of providing address book listings on a user device, the method comprising:
   managing an address book by assigning weights to listings in the address book based on predetermined criteria;
   providing a list of the listings in a sorted order based on the assigned weights, independent of an alphanumerical ordering;
   calculating another weight based on an association between a selected individual and other individuals which were previously sent the same type of communication;
   tabulating a contextual access weight; and
   determining a master weight based on frequency of context,
   wherein the weights are assigned based on frequency of sending,
   wherein a computer infrastructure of a service provider performs the steps of managing, providing, calculating, tabulating and determining for a customer having the user device, and
   further comprising allowing a user to select a mode on the user device and, after the user selects the mode, sorting recipients for the selected mode using a most frequently accessed (MFA) scenario.

20. The method of claim 19, wherein the assigning is based on frequency of times the listings are accessed over a period of time.

21. The method of claim 20, wherein the assigned weights are modified based on an action type.

22. The method of claim 20, wherein the assigned weights are modified based on access by association via the calculating of the other weight.

23. The method of claim 19, further comprising charging a fee for providing the steps of claim 19.

24. The method of claim 19, wherein the steps of claim 19 are provided in software or hardware by a service provider on a subscription or fee basis.

25. The method of claim 24, wherein the assigned weights are maintained separately for separate action types.

26. The method of claim 19, wherein the assigned weights are moving weights over a predetermined period of time and change dynamically.

27. The method of claim 19, wherein the at least one assigned weight increases based on a number of times the listing was previously accessed.

28. The method of claim 19, wherein a most heavily weighted listing is automatically provided in a send field.

29. The method of claim 19, wherein further listings are provided to the user based on past associations of a selected listing.

30. The method of claim 19, further comprising at least one additional associated listing resulting from the calculating of the other weight when a user selects a listing from the address book.

31. A system of providing address book listings on a user device comprising hardware having a server having a database containing data associated with one or more address books, and at least one of a hardware and software component for assigning weights to listings in the address book based on at least one of: frequency of past requests, access by association and action type, providing the weighted listings in a sorted order, independent of an alphanumerical sort order, and calculating another weight based on an association between a selected recipient and other recipients which were previously sent the same type of communication, wherein the weights are assigned based on frequency of sending, and wherein the system tabulates a contextual access weight and determines a master weight based on frequency of context, and wherein a computer infrastructure of a service provider performs the assigning, providing and calculating for a customer having the user device, and further comprising allowing a user to select a mode on the user device and, after the user selects the mode, sorting recipients for the selected mode using a most frequently accessed (MFA) scenario.

32. The system of claim 31, further comprising at least one of a hardware and software component for modifying the assigned weights based on a scheme.

33. The system of claim 31, wherein the at least one of a hardware and software component resides on a server provided by a service provider.

34. The system of claim 31, further comprising at least one of a hardware and software component for automatically providing in a sending field a listing which is most heavily weighted.

35. The system of claim 31, further comprising at least one of a hardware and software component which automatically updates the assigned weights based on predetermined time periods, regardless of access.

36. The system of claim 31, wherein the assigned weights are determined separately for one or a combination of action types, and changes dynamically over a period of time, regardless of a requested action.

37. The system of claim 31, wherein the hardware comprises a device having a keyboard or keypad.

38. A cell phone comprising hardware in combination with a computer program product comprising a computer usable storage medium having readable program code embodied in the medium, the computer program product includes at least one component to:
- assign a weight of each listed recipient in an address book;
- sort the each listed recipient according to the assigned weight into a user format;
- provide a sorted user format to a user,
- tabulate a contextual access weight and determine a master weight based on frequency of context; and
- calculate another weight based on an association between a selected recipient and other recipients which were previously sent the same type of communication,
- wherein the weights are assigned based on frequency of sending,
- wherein a computer infrastructure of a service provider performs the steps of assign, sort, provide, tabulate and calculate for a customer having the cell phone and receives payment for performing said steps from a sale of advertising content, and
- wherein, after it is determined that the user desires to implement a most frequently accessed (MFA) scenario, the computer program product includes at least one component to allow the user to select a mode and, after the user selects the mode, sort recipients for the selected mode using the MFA scenario.

39. A process for integrating computing infrastructure, comprising integrating computer-readable code into a computer system, wherein the computer system comprises a computer usable storage medium, wherein the code in combination with the computer system is capable of performing a method on a user device comprising:
- determining a weight of each identifier in an address book;
- sorting the each identifier in a descending order or ascending order according to the determined weight, independent of an alphanumerical sorting;
- providing a list to a user on a device having a keyboard or keypad based on the sorting of each identifier;
- tabulating a contextual access weight and determining a master weight based on frequency of context;
- calculating another weight based on an association between a selected recipient and other recipients which were previously sent the same type of communication; and
- separately maintaining, from a listing of names previously accessed, a most frequently accessed (MFA) list in the user device for each of the following modes:
  - telephone calls;
  - emails; and
  - short message servicing (SMS) messages,
- wherein the determining assigns the weights based on frequency of sending, and
- wherein each separately maintained MFA list for the telephone calls, the emails and the SMS messages is automatically and dynamically changed, and further comprising:
- determining whether the user wishes to implement an MFA scenario, and, after it is determined that the user desires to implement the MFA scenario, allowing the user to select the mode on the user device and, after the user selects the mode, sorting recipients for the selected mode using the MFA scenario.

40. The product of claim 38 in combination with a device having a keyboard or keypad.

* * * * *